INVENTOR
George B. Karnofsky

United States Patent Office 3,528,256
Patented Sept. 15, 1970

3,528,256
FREEZE CRYSTALLIZATION USING DIRECT REFRIGERANT
George B. Karnofsky, Mount Lebanon, Pa., assignor to Blaw-Knox Company, Pittsburgh, Pa., a corporation of Delaware
Filed Feb. 13, 1967, Ser. No. 615,479
Int. Cl. B01d 9/04
U.S. Cl. 62—58                                9 Claims

ABSTRACT OF THE DISCLOSURE

This invention relates to method and apparatus for producing pure crystals by partial crystallization of aqueous solutions by direct contact with refrigerant and particularly to the partial freezing of sea water or brackish water. By this method, aqueous solution is partially crystallized by vaporization of a refrigerant such as normal butane in direct contact with the solution; the crystals are washed to free them from adhering solution, and then if the crystals be ice, they are melted to produce potable water. This invention is applicable to crystallization of chemical compounds such as caustic, metal sulfates, and other compounds formed by chilling saturated solutions but the specific example described is the production of pure ice from brine.

---

Figure 1:
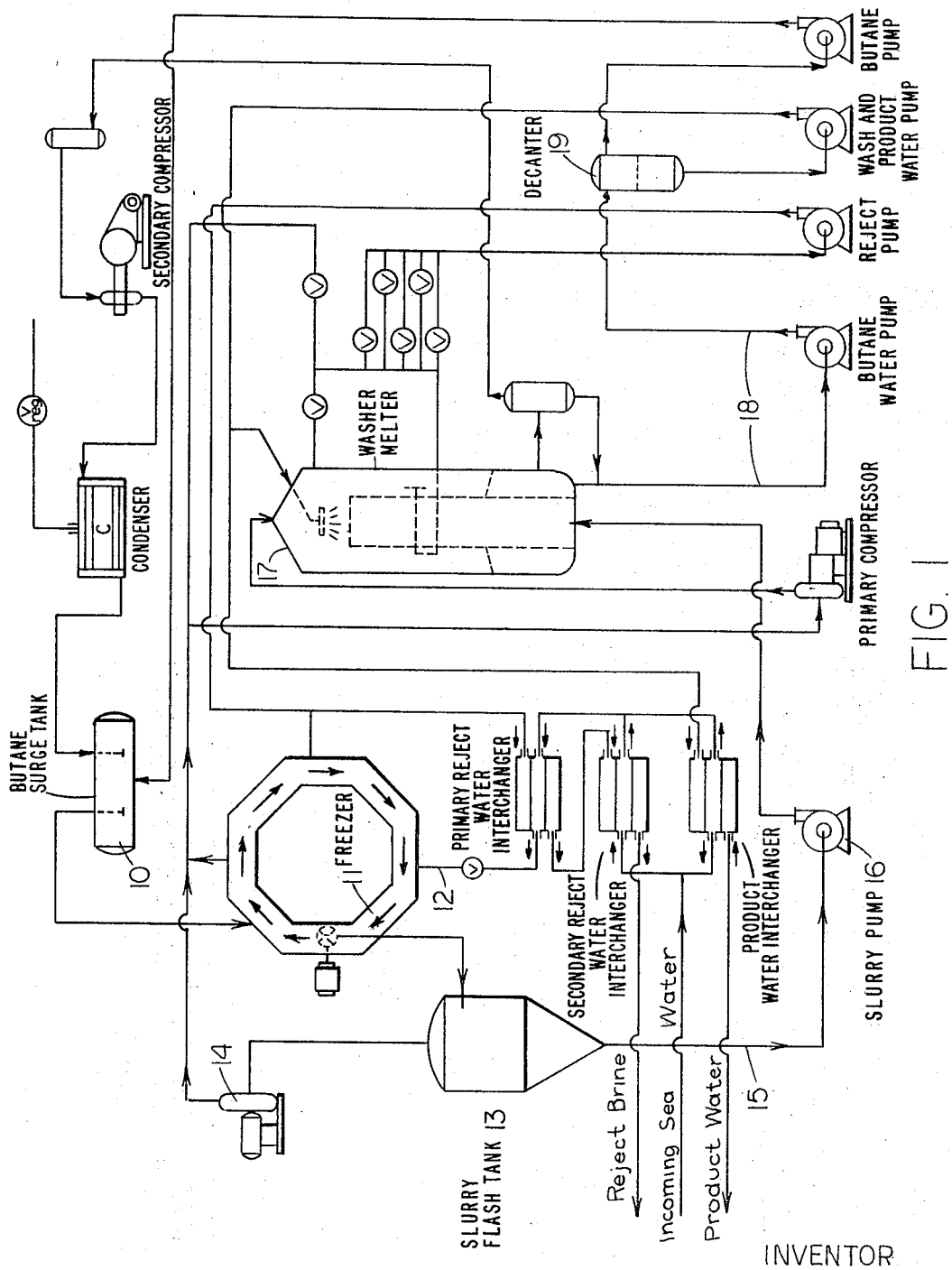

This invention relates to method and apparatus for producing pure crystals by partial crystallization of aqeuous solutions by direct contact with refrigerant and particularly to the partial freezing of sea water or brackish water. By this method, aqueous solution is partially crystallized by vaporization of a refrigerant such as normal butane in direct contact with the solution; the crystals are washed to free them from adhering solution, and then if the crystals be ice, they are melted to produce potable water. This invention is applicable to crystallization of chemical compounds such as caustic, metal sulfates, and other compounds formed by chilling saturated solutions but the specific example hereinafter described is the production of pure ice from brine. An apparatus for carrying out these steps is shown, for example, in my patent application Ser. No. 571,611 filed Aug. 10, 1966 using a freezer such as disclosed in Dunn application Ser. No. 521,777 filed Jan. 20, 1966, but the problem which this invention solves is common to any partial freezing system employing direct contact with refrigerant.

It is desirable to have as much liquid refrigerant in the freezer as possible, since the size of the freezing apparatus depends in part on the amount of refrigerant suspended in the freezing brine, and the vaporization rate of refrigerant is proportional to the surface area of the refrigerant droplets. On the other hand, residual liquid refrigerant in the ice-brine slurry from the freezer interfers with ice washing and must be removed from the slurry prior to washing.

There is another reason why residual refrigerant in the slurry has to be minimized. Many refrigerants, butane for example, may form hydrates with water at the conditions existing in the freezer. Hydrates are formed as undesirably small, slimy crystals mixed with the ice which interfere with the subsequent washing of the ice. Formation of hydrates can be eliminated or reduced to a practical minimum by minimizing the amount of refrigerant suspended in the brine in the freezer.

I have found that if it is attempted to maintain a refrigerant content at the outlet from the freezer sufficiently low to meet the requirement for satisfactory washing or for reduction of hydrate formation, the freezer becomes excessively large as a consequence of inefficient vaporization. For reasonably efficient freezer operation, the refrigerant content of the brine-ice slurry leaving the freezer should be more than can be tolerated in the washing step; and where the refrigerant can form hydrates with water, there may be small crystals of hydrate contaminating the ice leaving the freezer. Separation of residual refrigerant by gravity separation or centrifugation has not been successful, especially for hydrocarbon refrigerants that are lighter than water, in which case the ice floats at the interface between brine and refrigerant. Separation of liquid refrigerant does not, in any case, remove hydrate particles.

I have devised a method and apparatus for eliminating the problems of excessive refrigerant accumulation in the ice-brine slurry. By my invention, the capital investment is much reduced and the operating efficiency of freezers greatly increased.

I provide in an apparatus for producing ice by partial freezing of aqueous solutions by direct contact with refrigerant, comprising a refrigerant storage vessel, a freezer for contacting refrigerant with aqueous solution to be partially frozen, an ice washer and an ice melter, the improvement comprising a flash tank or chamber receiving ice containing residual unvaporized refrigerant from the freezer, means for maintaining the pressure in the flash tank or chamber below the pressure of the freezer, and means for delivering the ice from the flash tank or chamber to the ice washer. By my process, I condense refrigerant to the liquid state, add the condensed refrigerant to an aqueous solution to be partially frozen, vaporize the refrigerant in the freezer to form an ice slurry, remove the ice slurry from the freezer to a chamber maintained at a pressure below that of the freezer to flash off remaining refrigerants, and deliver the ice slurry to a washer where ice is washed free of brine and then to a melter where ice is melted to potable water.

In the foregoing general description, I have set out certain objects, purposes and advantages of my invention. Other objects, purposes and advantages will be apparent from a consideration of the following description and the accompanying drawing showing a flow diagram of a plant for producing potable water from saline water, incorporating my invention.

Figure 2:
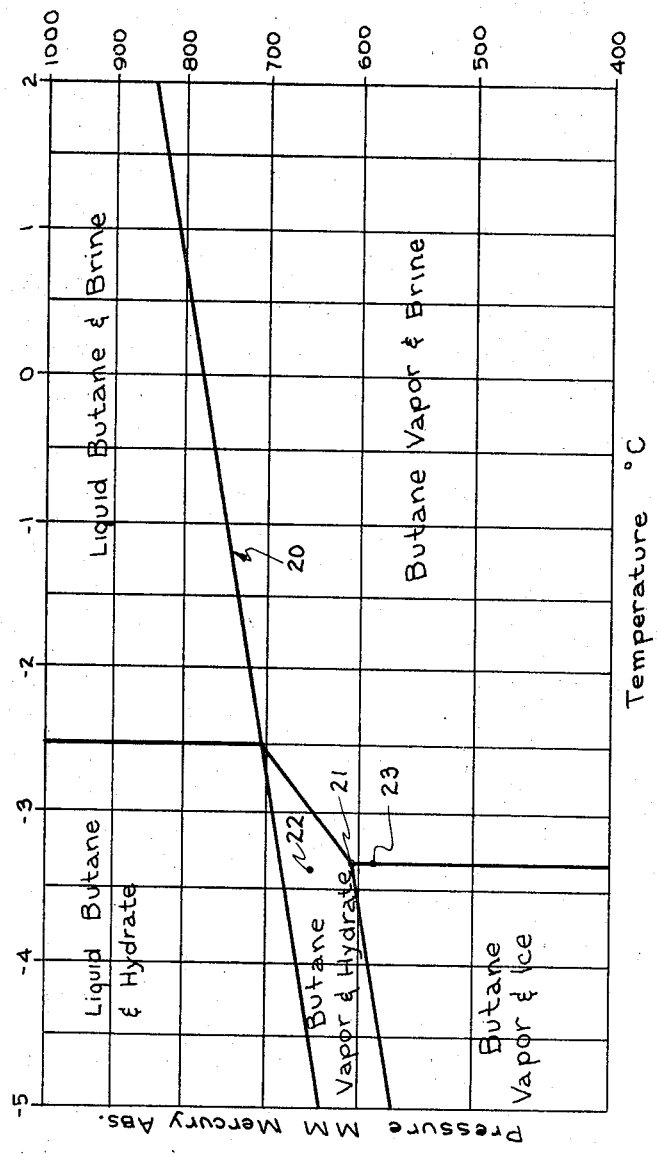

These and other objects and advantages are obtained by my invention as hereinafter more fully described with reference to the accompanying drawings in which:

FIG. 1 is a simplified block diagram showing schematically an apparatus for practice of the invention as connected in operative relationship to employ my method; and FIG. 2 is a phase diagram for butane and sea water brine containing 6% salts.

Referring to FIG. 1 of the drawings, I have illustrated a saline water conversion plant including a refrigerant storage tank 10 for a liquid refrigerant such as butane, connected to a freezer 11 receiving sea water through line 12. The liquid butane from tank 10 is vaporized in freezer 11 to form an ice slurry which is delivered to a slurry flash tank 13 maintained at a pressure below that of freezer 11 by means of auxiliary compressor 14. Any butane remaining in the slurry is caused to flash off the liquid in tank 13 and the slurry is then delivered by line 15 through pump 16 into washer-melter 17 where the ice is first washed then melted by condensing butane on it. The compressor 14 compresses the vapor flashed off in tank 13 to the pressure maintained in the freezer 11. Melted ice mixed with liquid butane is delivered from washer-melter 17 through line 18 to decanter 19 where product water is separated from liquid butane.

It is important in the practice of this process that capital cost of equipment and power cost to operate the compressors be balanced for optimum economy. Without the flash tank 13 to remove residual butane the freezer 11 would be uneconomically large. The size of the freezer 11 and the power used by the primary compressor are substantially reduced by allowing up to 5% by weight of butane to remain unvaporized in the slurry flowing from freezer 11 to flash tank 13. The additional cost of equipment and power represented by slurry flash tank 13 and auxiliary compressor 14 is less than the corresponding savings in the freezer and primary compressor.

The manner in which the slurry flash tank serves to decompose hydrate particles which may form in the freezer is best understood by reference to FIG. 2. This is a phase diagram of the butane-sea water brine system, the brine containing 6% salts, as might be the case in a practical freezer in a process recovering potable water from sea water containing 3.5% salts. In FIG. 2, absolute pressure is plotted against temperature, the plotted curves representing the equilibria between the labelled phases. This phase diagram is characteristic of all clathrate hydrate phase diagrams, in that the line 20 portrays the vapor-liquid equilibrium of the hydrate former, and the point 21 is the triple-point at which hydrate, butane vapor, ice and brine are at equilibrium. The temperature at this triple-point 21 is the freezing point of brine in the freezer.

On this diagram the point 22 represents the typical condition existing in the freezer. The pressure at point 22 is 650 mm. mercury absolute, and the temperature is −3.3° C., the freezing point of 6% brine. Butane hydrate, not ice, is clearly the equilibrium solid phase, but ice is formed predominantly because it crystallizes much more rapidly than does hydrate, especially where there is only little liquid butane suspended in the ice-brine slurry. At the point 23, corresponding in this case to an absolute pressure of 590 mm. mercury, hydrate cannot exist in equilibrium. This gives the basis for choosing the pressure in the flash tank 13. The pressure should be less than 610 mm., the pressure at the triple-point 21.

I have, for convenience, described the process employing normal butane as the refrigerant. This invention applies equally well when other suitable refrigerants such as isobutane, butene-1, butene-2, isobutylene, their mixtures, or non-hydrocarbons like Freon C-318 are used. A suitable refrigerant will boil below 0° C. at atmospheric pressure and either not form a hydrate at all or form slowly a hydrate whose critical decomposition temperature in equilibrium with water is only slightly above the freezing point of water.

I have, for convenience, described the apparatus in terms of a freezer 11 similar to that described in the Dunn patent application previously cited and a combined washer-melter such as disclosed in my cited application. The slurry flash tank 13 is illustrated herein as a cyclonic vapor-liquid separator such as is well known to the art. Any freezer suitable for making ice by vaporization of refrigerant in direct contact with solution may be used. Likewise, a device suitable for flashing gas from liquid, such as is, for example, used for deaeration, may be used for flashing refrigerant from the slurry; or the equipment used for flashing could resemble the freezer itself, which is of necessity designed for vapor-liquid separation, if considerable retention time should be needed for decomposition of hydrate.

While I have illustrated and described a presently preferred embodiment of my invention, it will be understood that this invention may be otherwise embodied within the scope of the following claims.

I claim:

1. In an apparatus for producing washed uncontaminated crystals by partial crystallization of aqueous solutions having a single freezer crystallizing vessel, of annular ring shape configuration with means recirculating the solution therein, means for supplying aqueous solution to be crystallized to said freezer-crystallizing vessel, means for supplying liquid refrigerant to said freezer-crystallizing vessel, means for removing vaporized refrigerant from said freezer-crystallizing vessel, and means receiving a partially crystallized slurry from said freezer-crystallizing vessel for washing the crystals free of residual solution, the improvement comprising a flash chamber connected to the freezer-crystallizing vessel to receive said slurry in passage towards said washer and means for maintaining a pressure in said flash chamber below the pressure in said single freezer-crystallizing vessel.

2. Apparatus as claimed in claim 1 in which the said flash chamber is a vessel of volumetric capacity to provide retention time required to decompose hydrates of the refrigerant formed in the said crystallizing vessel.

3. Apparatus as in claim 2 in which the pressure in said flash chamber is below 610 mm. of mercury.

4. An apparatus as claimed in claim 1 wherein the means for maintaining the pressure in the flash chamber below that of the freezer is a compressor removing vapor from the flash chamber and delivering it to said means for removing vaporized refrigerant from said vessel.

5. The method of removing residual refrigerant from crystal slurries made by vaporizing refrigerant by contacting liquid refrigerant with aqueous solution in a single freezer-crystallizing vessel comprising the steps of:
 (a) adding liquid refrigerant to an aqueous solution to be partially crystallized;
 (b) vaporizing the liquid refrigerant to generate a crystal slurry in a single freezer-crystallizing vessel of annular ring shape configuration with means recirculating the solution therein;
 (c) reducing the pressure of said crystal slurry below that maintained in step (b) above whereby residual refrigerant is removed; and
 (d) washing said crystals free of the residual aqueous solution from which the crystals were formed.

6. In a method of producing ice by partial freezing of an aqueous solution by direct contact with refrigerant in a single freezer-crystallizing vessel of annular ring shape configuration with means recirculating the solution therein, the step of subjecting said ice to a reduced pressure lower than the pressure at formation in said single freezer-crystallizing vessel.

7. The method of claim 5 in which the crystals are ice formed by partial freezing of the aqueous solution.

8. The method of claim 7 in which the refrigerant tends to form hydrates on contact with the aqueous solution and the slurry is detained in step (c) at a pressure which is below that of the triple-point at which ice, aqueous solution, refrigerant and refrigerant hydrate are in equilibrium.

9. The method according to claim 5 further characterized by compressing refrigerant vapor removed in step (c) to the pressure maintained in step (b).

References Cited

UNITED STATES PATENTS

| 3,285,026 | 11/1966 | Svanoe | 62—58 |
| 3,304,734 | 2/1967 | Dunn | 62—58 |
| 2,997,856 | 8/1961 | Pike | 62—58 |
| 3,126,334 | 3/1964 | Harlow | 210—60 |
| 3,243,966 | 4/1966 | Glew | 62—4 |
| 3,400,549 | 9/1968 | Karnofsky | 62—58 |

NORMAN YUDKOFF, Primary Examiner

R. T. FOSTER, Assistant Examiner

U.S. Cl. X.R.

62—123